United States Patent
Liu et al.

(10) Patent No.: US 12,242,437 B2
(45) Date of Patent: Mar. 4, 2025

(54) AUTOMATED DETERMINATION OF ACCURATE DATA SCHEMA

(71) Applicant: INTERNATIONAL BUSINESS MACHINES CORPORATION, Armonk, NY (US)

(72) Inventors: Yao Dong Liu, Xian (CN); Jiang Bo Kang, Xian (CN); Jun Wang, Xian (CN); Dong Hai Yu, Xian (CN); Song Bo, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 641 days.

(21) Appl. No.: 17/371,508

(22) Filed: Jul. 9, 2021

(65) Prior Publication Data

US 2023/0010147 A1    Jan. 12, 2023

(51) Int. Cl.
*G06F 16/00* (2019.01)
*G06F 16/21* (2019.01)
*G06F 16/23* (2019.01)
*G06F 16/28* (2019.01)

(52) U.S. Cl.
CPC ........ *G06F 16/213* (2019.01); *G06F 16/2365* (2019.01); *G06F 16/285* (2019.01)

(58) Field of Classification Search
CPC .................. G06F 16/213; G06F 16/285; G06F 16/2365
See application file for complete search history.

(56) References Cited

U.S. PATENT DOCUMENTS

| | | | |
|---|---|---|---|
| 7,822,786 B2 | 10/2010 | Charlet et al. | |
| 9,020,981 B2 | 4/2015 | Morrison et al. | |
| 2013/0086104 A1* | 4/2013 | Morrison | G06F 16/211 |
| | | | 707/769 |
| 2014/0372361 A1* | 12/2014 | Lee | G06F 16/9535 |
| | | | 706/50 |
| 2020/0012666 A1 | 1/2020 | Walters et al. | |
| 2020/0012935 A1* | 1/2020 | Goodsitt | G06T 7/194 |
| 2020/0242135 A1 | 7/2020 | Shah et al. | |
| 2020/0319857 A1 | 10/2020 | Lonial et al. | |
| 2021/0209159 A1* | 7/2021 | Mahanta | G06N 20/00 |
| 2022/0058449 A1* | 2/2022 | Goodsitt | G06N 5/01 |

OTHER PUBLICATIONS

Armbrust, Michael, et al. "Spark sql: Relational data processing in spark." Proceedings of the 2015 ACM SIGMOD international conference on management of data. 2015.*

(Continued)

*Primary Examiner* — Nan Hutton
(74) *Attorney, Agent, or Firm* — Gavin Giraud; Andrew D. Wright; Calderon Safran & Wright P.C.

(57) ABSTRACT

Systems and computer-implemented methods select a subset of methods to generate data schemas for input data from a list of methods for generating data schemas, based on output of a regression model; generate a candidate schema for each method in the subset of methods to generate data schemas; and generate a master data schema for the input data by merging the candidate schema for each method in the subset of methods to generate data schemas, utilizing predetermined rules.

20 Claims, 8 Drawing Sheets

Continued at FIG. 5B

(56) References Cited

OTHER PUBLICATIONS

Hu, Han, et al. "Toward scalable systems for big data analytics: A technology tutorial." IEEE access 2 (2014): 652-687.*

Doan, AnHai, Pedro Domingos, and Alon Y. Halevy. "Reconciling schemas of disparate data sources: A machine-learning approach." Proceedings of the 2001 ACM SIGMOD international conference on Management of data. 2001.*

Mell et al., "The NIST Definition of Cloud Computing", NIST, Special Publication 800-145, Sep. 2011, 7 pages.

Kopecky, "What are database schemas? 5 minute guide with examples", https://www.educative.io/blog/what-are-database-schemas-examples, Oct. 8, 2020, 15 pages.

Anonymous, "Top 6 Regression Algorithms Used In Data Mining And Their Applications In Industry", https://analyticsindiamag.com/top-6-regression-algorithms-used-data-mining-applications-industry/, Sep. 19, 2017, 8 pages.

* cited by examiner

```
<Field measure="continuous" name="Snacks" role="input storage="integer
    <Range maxValue="1" minValue="0" />
    FieldFormat>
        <NumberFormat alignment="auto" decimalPlaces="0" decimalSymbol+"period"
formatType+"standard" groupingSymbol+ "none" name=""width="-1" />
</Field>
<Field measure="continuous" names="Tinned Goods" role="input" storage="integer">
    <Range maxValue="1" minValue="0" />
    <FieldFormat>
        <NumberFormat alignment="auto" decimalPlaces="0" decimalSymbol="period"
formatType="standard" groupingSymbol="none" name="" width="-1" />
...
```

FIG. 7

AUTOMATED DETERMINATION OF ACCURATE DATA SCHEMA

BACKGROUND

Aspects of the present invention relate generally to data analysis and, more particularly, to the automated determination of accurate data schemas for big data inputs.

Collections of data to be utilized for data analysis are often stored in databases or data frames. In general, a database is a structured/organized collection of data. Where databases are more complex, they are often developed using formal design and modeling techniques. In general, a data frame is a way of storing data (e.g., data tables) used for data analysis. A data frame may be a table or a two-dimensional array-like structure in which each column contains values of one variable and each row contains one set of values from each column.

A data schema may describe both the organization of data and the relationships between tables in a given database or data frame. In general, the term data schema refers to an organization of data as a blueprint of how data is structured for data analysis. Developers may generate a data schema in advance of creating a database or data frame in order to determine what components are necessary and how they will be connected to each other. A data schema specifies facts that can enter a database or data frame, or facts of interest to possible end-users. For example, in a relational database, a schema defines tables, fields, relationships, views, indexes, packages, procedures, functions, queues, triggers, and other elements.

The field of big data is concerned with ways to analyze, systematically extract information from, or otherwise deal with, data sets that are too large or complex to be dealt with by traditional data-processing application software. The term big data generally refers to data sets with sizes that exceed the capacity of traditional software to process within an acceptable time and value. There is no particular data size limit associated with the term big data, but depending on processing capabilities of a user, the term may apply to data ranging from a few dozen terabytes to many zettabytes of data, for example.

SUMMARY

In a first aspect of the invention, there is a computer-implemented method including: selecting, by a computing device, a subset of methods to generate data schemas for input data, from a list of methods for generating data schemas, based on output of a regression model; generating, by the computing device, a candidate schema for each method in the subset of methods to generate data schemas; and generating, by the computing device, a master data schema for the input data by merging the candidate schema for each method in the subset of methods to generate data schemas, utilizing predetermined rules.

In another aspect of the invention, there is a computer program product including one or more computer readable storage media having program instructions collectively stored on the one or more computer readable storage media. The program instructions are executable to: determine a predetermined data category associated with input data of a user based on association rules; determine, from a list of methods for generating data schemas, a set of methods associated with the determined data category; generate a numeric indicator of schema accuracy for each method in the set of methods associated with the determined data category, using a regression model based on historic data; select a subset of the set of methods associated with the determined data category based on the numeric indicators; generate a candidate schema for each method in the subset of the set of methods associated with the determined data category; and generate a master data schema for the input data by merging the candidate schema for each method in the subset of the set of methods associated with the determined data category, utilizing predetermined rules.

In another aspect of the invention, there is system including a processor, a computer readable memory, one or more computer readable storage media, and program instructions collectively stored on the one or more computer readable storage media. The program instructions are executable to: determine a predetermined data category associated with input data of a user based on association rules; determine, from a list of methods for generating data schemas, a set of methods associated with the determined data category; generate a numeric indicator of schema accuracy for each method in the set of methods associated with the determined data category, using a regression model based on historic data; select a subset of the set of methods associated with the determined data category based on the numeric indicators; generate a candidate schema for each method in the subset of the set of methods associated with the determined data category; and generate a master data schema for the input data by merging the candidate schema for each method in the subset of the set of methods associated with the determined data category, utilizing predetermined rules.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 7 depicts a portion of a master data schema generated in accordance with aspects of the invention.

DETAILED DESCRIPTION

Figure 1:
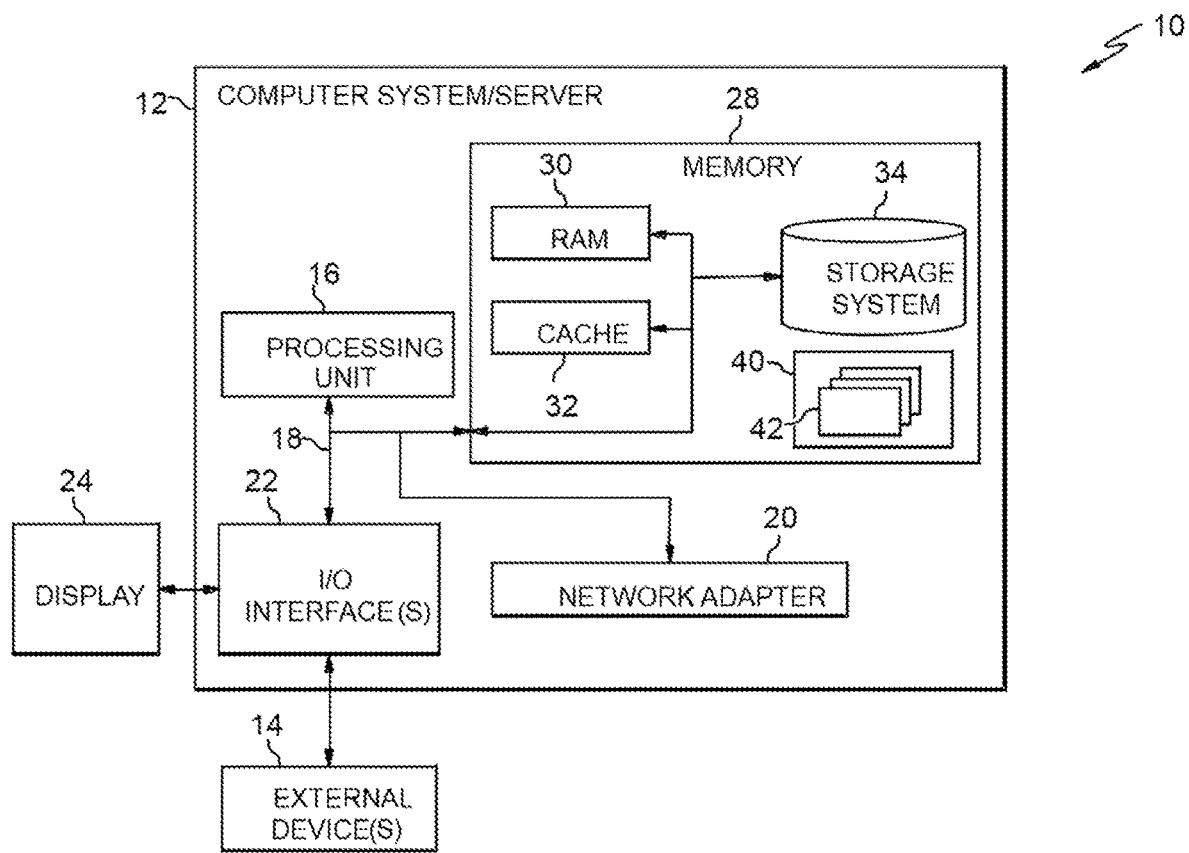
FIG. 1 depicts a cloud computing node according to an embodiment of the present invention.

Aspects of the present invention relate generally to data analysis and, more particularly, to the automated determination of accurate data schemas for big data inputs. In embodiments, a big data input for data science applications is first categorized using an association rule algorithm, then a regression model is used to identify the best (e.g., most accurate) schema generating methods from a pool of available schema generating methods. Implementations of the invention provide a dynamically updated list of associations between schema generating methods and data category types based on historic schema data.

In embodiments, a system and method are provided to: 1) define and create multiple methods to get a data schema for different types of data based on the purpose-of-usage of input data (e.g., big data in the form of time series data); 2) collect the purpose-of-usage related information of the input data from a user before creating a data schema; 3) perform feature engineering and dimensionality reduction for the input data based on the information from step 2, (e.g. remove unused features and bin features so that only the useful data will be used as input); 4) group the input data into a specified type using an association rule algorithm after step 3; 5) in the specified type from step 4, use a regression algorithm to select the best methods to get data schemas, wherein historical data is used to build a regression model (e.g., the top n methods will be selected as the best methods); 6) use the best methods from step 5 to get multiple candidate schemas of the input data, wherein all the best methods (e.g., 3 methods) will be used to create schemas which are then merged into one schema as a final candidate schema; 7) validate and refine the final candidate schema (e.g., a random record of a reasonable scope is selected from the input data to validate if the final candidate schema is correct); and 8) refine the final candidate schema when there is an error/issue found to obtain a final schema. The methods for getting data schemas associated with specified data types may be updated, as needed.

Embodiments of the invention constitute an improvement in the field of big data analytics, and more specifically, constitute an improvement in the field of automated schema generation for a big data input to be analyzed. In implementations, a technical solution is provided to the technical problem of accurately generating a data schema (e.g., an organizational and relationship structure for large amounts of input data, including fields, numeric ranges, data formatting, etc.) for big data inputs. For example, embodiments of the invention utilize an association rule algorithm to identify data categories associated with input data, utilize regression modeling to determine a numeric accuracy indicator for multiple possible data schemas associated with an input data category type, and merge the most accurate schemas to obtain a master schema. In embodiments, the master schema comprises an organization and relationship structure for a database or data frame to be generated, such that the database or data frame may be utilized to obtain information of interest from a big data input.

Some methods of generating schema rely on an analysis of all input data, which can be time or resource prohibitive when dealing with big data inputs. Other methods of generating schema rely on a random selection of sample data, which is then analyzed to generate schema. While such methods can be performed more quickly than methods relying on all input data, they lose accuracy and often generate schema that does not describe the correct data information (e.g., the Maximum or Minimum values are not correct, some categorical value is missing, etc.).

Implementations of the invention utilize machine learning to dynamically update associations between input data category types and different schema generating methods based on the automated generation of data schemas over time for multiple users and/or data inputs. In this way, embodiments of the invention enable the combination of the most accurate schema generating methods for a particular type or category of input data to produce a master data schema that is more accurate than conventional techniques, while utilizing less computer processing resources than methods that analyze all input data.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
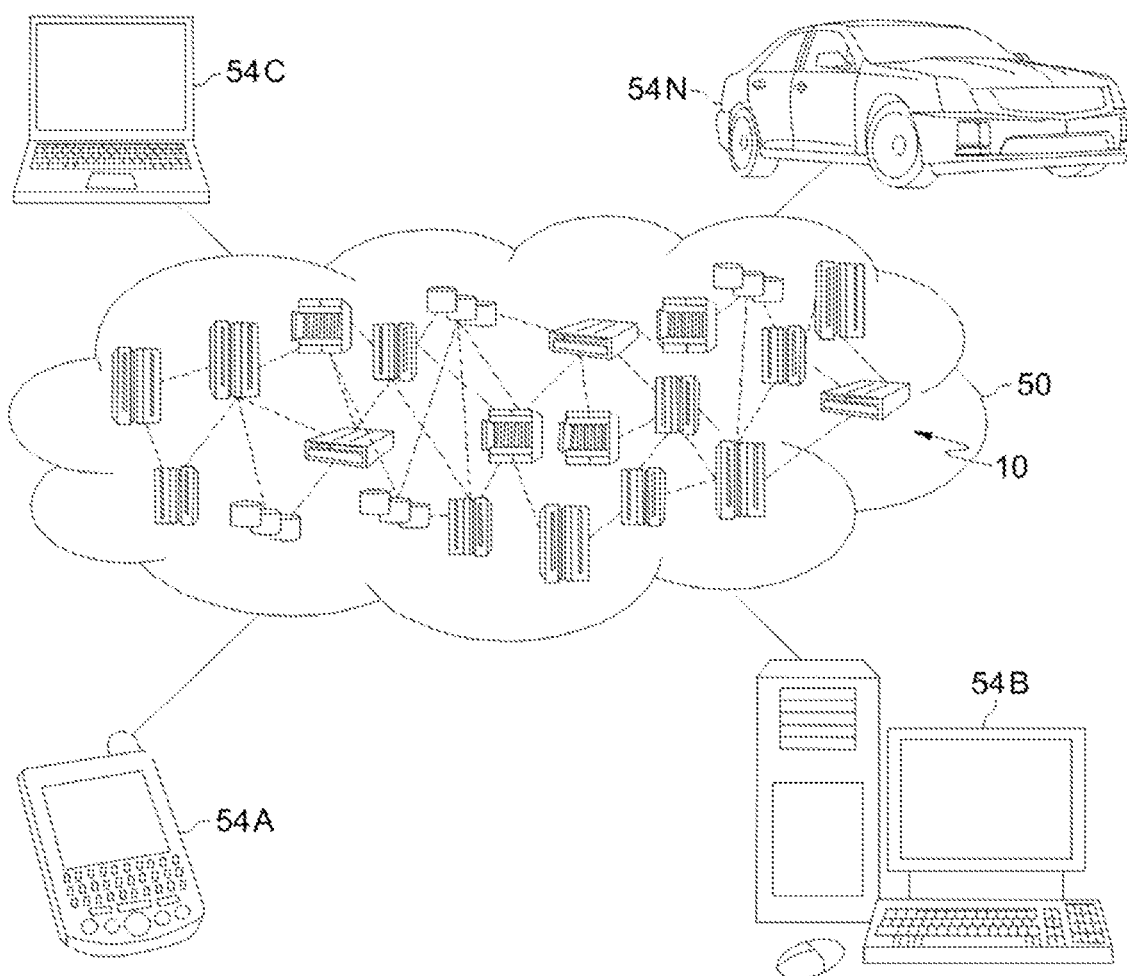
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
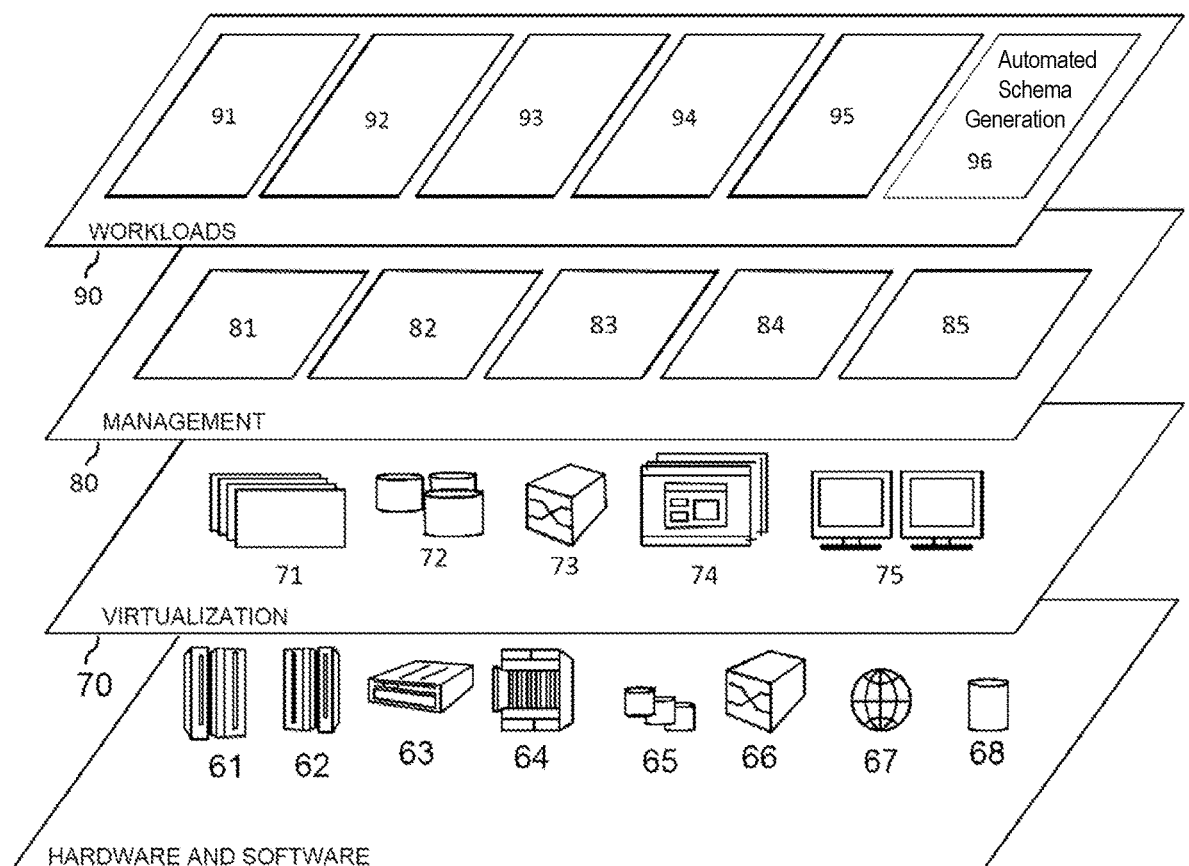
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated schema generation 96.

Implementations of the invention may include a computer system/server 12 of FIG. 1 in which one or more of the program modules 42 are configured to perform (or cause the computer system/server 12 to perform) one of more functions of the automated schema generation 96 of FIG. 3. For example, the one or more of the program modules 42 may be configured to: determine a predetermined data category associated with input data of a user based on association rules; access a list of methods for generating data schemas, wherein each of the methods of generating data schemas is associated with one or more predetermined data categories; determine, from the list of methods for generating data schemas, a set of methods associated with the determined data category; generate a numeric indicator of schema accuracy for each method in the set of methods associated with the determined data category, using a regression model based on historic data; select a subset of the set of methods associated with the determined data category based on the numeric indicators; generate a candidate schema for each method in the subset of the set of methods associated with the determined data category; and generate a master data schema for the input data by merging the candidate schema for each method in the subset of the set of methods associated with the determined data category, utilizing predetermined rules.

Figure 4:
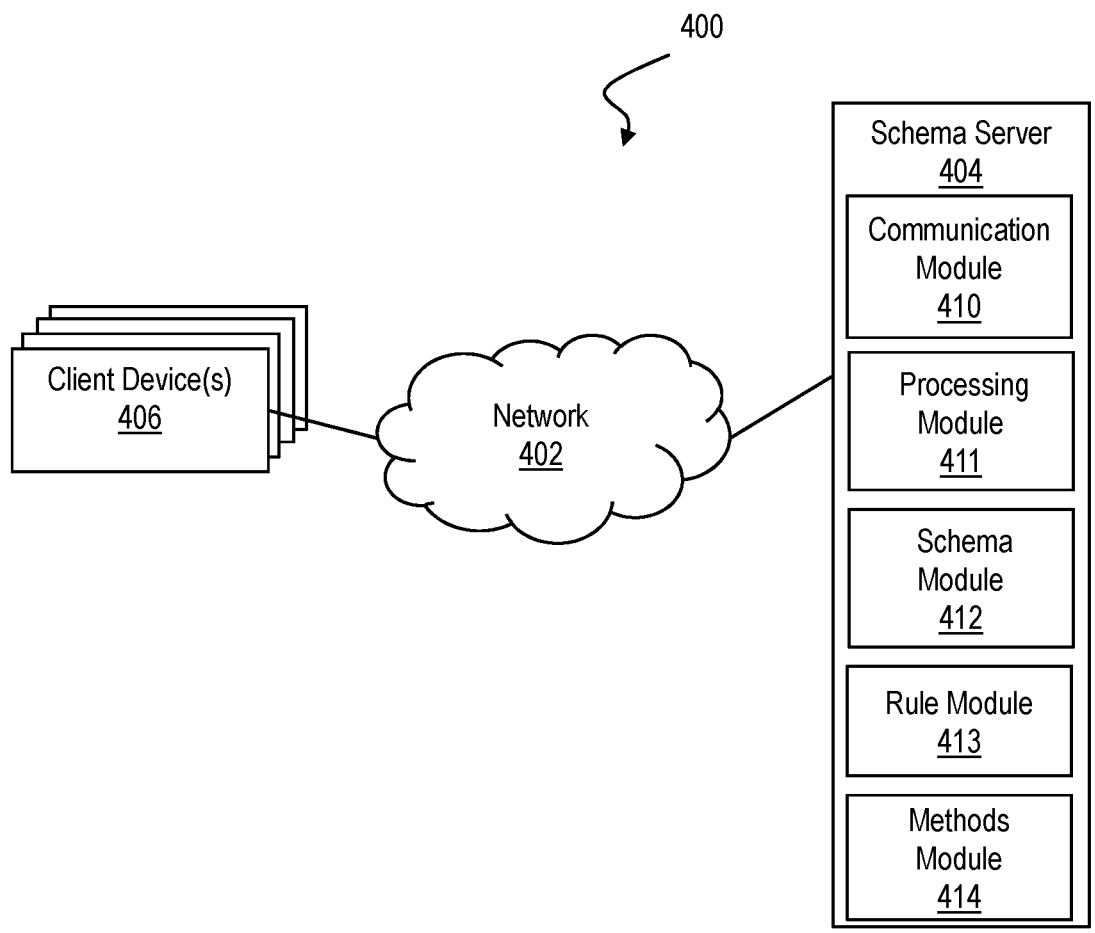
FIG. 4 shows a block diagram of an exemplary environment in accordance with aspects of the invention.

FIG. 4 shows a block diagram of an exemplary schema generating environment 400 in accordance with aspects of the invention. In embodiments, schema generating environment 400 includes a network 402 enabling communication between a schema server 404 and one or more client devices 406.

The schema server 404 may comprise the computer system/server 12 of FIG. 1, or elements thereof. The schema server 404 may be a computing node 10 in the cloud computing environment 50 of FIG. 2. In implementations, the schema server 404 is a special purpose computing device providing schema generating services for computing devices used by cloud consumers, such as the personal digital assistant (PDA) or cellular telephone 54A, the desktop computer 54B, the laptop computer 54C, and/or automobile the computer system 54N of FIG. 2, for example.

In embodiments, the schema server 404 comprises one or more modules, each of which may comprise one or more program modules such as program modules 42 described with respect to FIG. 1. In the example of FIG. 4, the schema server 404 includes: a communication module 410 configured to exchange information with the one or more client devices 406; a processing module 411 configured to process and refine the input data based on usage information; a schema module 412 configured to automatically generate a data schema for data input of a user; a rule module 413 configured to store predetermined rules or algorithms utilized by the schema module 412; and a methods module 414 configured to store a list of methods for generating data schemas (wherein each of the modules may comprises program module(s) 42 of FIG. 1, for example).

The one or more client devices 406 may comprise the computer system/server 12 of FIG. 1, or elements thereof. The one or more client devices 406 may be a client device (e.g., 54A) in the cloud computing environment 50 of FIG. 2. In implementations, the client devices provide input data for which a schema is desired, as well as information regarding the input data, to the schema server 404 via the network 402.

In embodiments, the quantity of devices and/or networks in schema generating environment 400 is not limited to what is shown in FIG. 4. In practice, the schema generating environment 400 may include additional devices and/or networks; fewer devices and/or networks; different devices and/or networks; or differently arranged devices and/or networks than illustrated in FIG. 4. In embodiments, separate modules of FIG. 4 may be integrated into a single module. Additionally, or alternatively, a single module of FIG. 4. may be implemented as multiple modules.

Figure 5A:
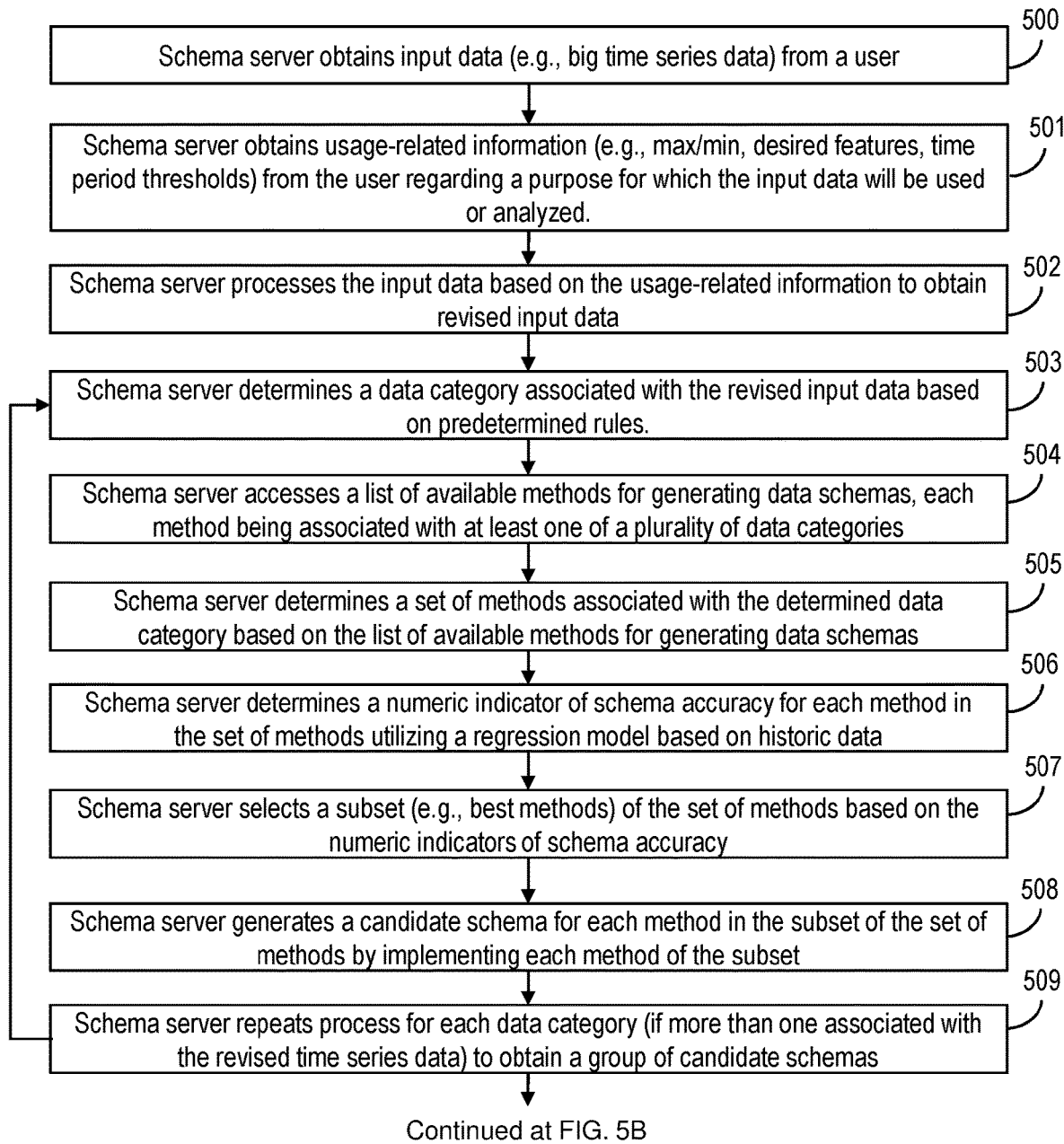
FIGS. 5A-5B show a flowchart of an exemplary method in accordance with aspects of the invention.
Figure 5B:
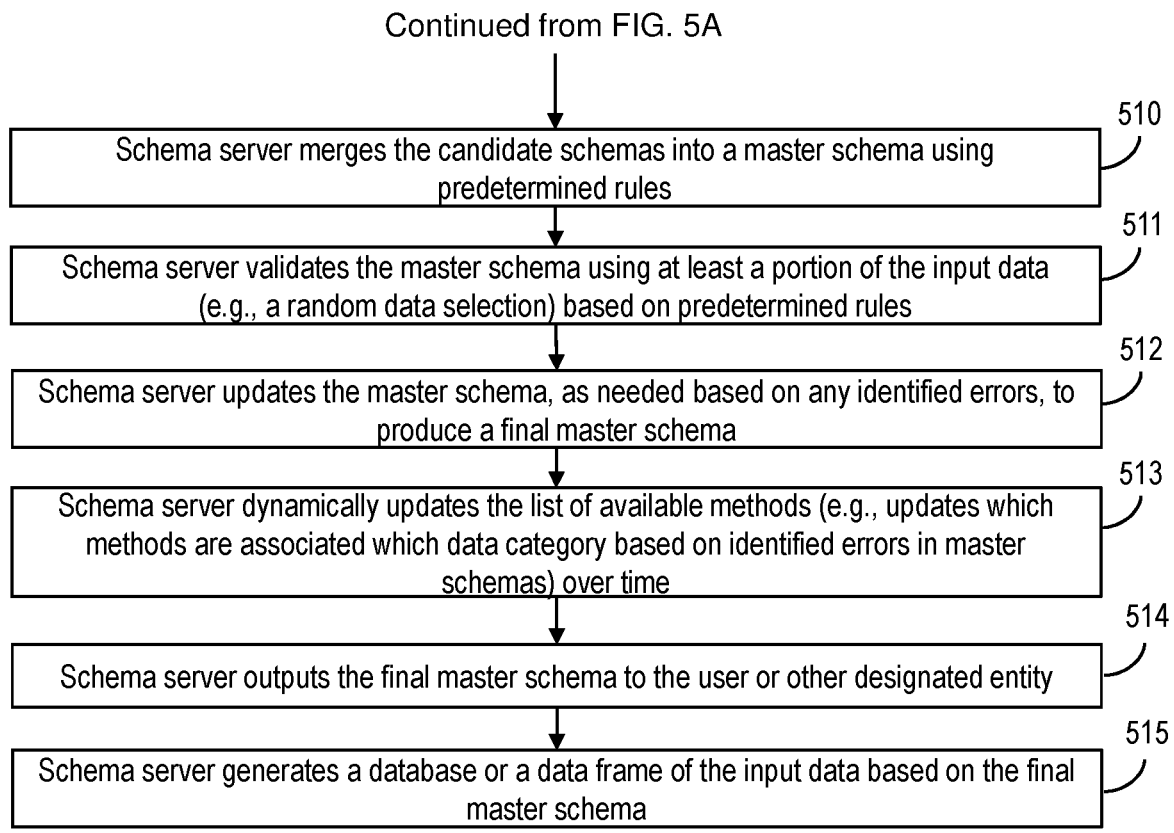

FIGS. 5A and 5B show a flowchart of an exemplary method in accordance with aspects of the present invention. Steps of the method may be carried out in the environment of FIG. 4 and are described with reference to elements depicted in FIG. 4.

With initial reference to FIG. 5A, at step 500, the schema server 404 obtains input data from a user. In aspects of the invention, the user requests a data schema for the input data, which may be used to generate a database or data frame for the input data. In embodiments, the input data is in the form of big data to be utilized in data analysis. For example, the input data may range in size from terabytes (i.e., $10^{12}$ bytes) to zettabytes ($10^{21}$ bytes). In embodiments, the communication module 410 of the schema server 404 implements step 500.

At step 501, the schema server 404 obtains usage-related information from the user regarding a purpose for which the input data will be used or analyzed. Usage-related information may include, for example, maximum and minimum values for parameters, parameters of interest to the user, and time period thresholds. For example, a user may wish to view values for certain parameters within the last two days, weeks, months, etc., or may wish to view values for parameters over or under maximum and minimum values (e.g., all snacks selling over a maximum threshold value of 1000 units within the last week).

In implementations, the schema server 404 provides a graphical user interface (e.g., a web portal) through which users may enter usage-related information. In aspects of the invention, the graphical user interface provides user-selectable options and/or user-fillable forms which provides the schema server 404 with the usage-related information. By way of example, the following questions may be presented to users in order to obtain usage-related information. What periods of data time is/are more useful or preferred? What features can be removed with minimal impact? What features are significant for analysis? If data is sensitive about categorical fields, list the categorical fields. If data is sensitive about maximum and minimum values, list the categorical fields. What features are needed for analysis? Is binning desired/needed? In embodiments, the communication module 410 of the schema server 404 implements step 501.

Optionally, at step 502, the schema server 404 processes the input data based on the usage-related information obtained at step 501 to obtain revised input data utilizing data processing techniques. In implementations, the schema server 404 defines a portion of the input data as data of interest to the user (e.g., parameters and parameter thresholds of interest) based on the usage-related information obtained at step 501, wherein the remaining portion of the input data is extraneous data. In implementations, the schema server 404 revises input data by removing the extraneous data, performing dimensionality reduction, combining information, and/or performing data binning, resulting in revised input data. In general, the term data binning refers to a data pre-processing technique (a form of quantization) used to reduce the effect of minor observation errors. The original data values which fall into a given small interval (i.e., a bin) are replaced by a value representative of that interval, often the central value. In general, the term dimensionality reduction refers to the transformation of data to reduce the number of input variables in a dataset. The schema server 404 may filter out input data which is not necessary to meet the user's goals as determined by the usage-related information. In implementations, the revised input data, while smaller in size than the original input data, constitutes big data. In one example, the revised input data ranges in size from terabytes (i.e., $10^{12}$ bytes) to zettabytes ($10^{21}$ bytes). In embodiments, the processing module 411 of the schema server 404 implements step 503.

At step 503, the schema server 404 determines a predetermined data category that matches the input data or revised input data based on one or more predetermined rules or algorithms. The predetermined rules may provide associations between types of data and one or more of a plurality of predetermined data categories. In embodiments, the schema server 404 utilizes association rule learning (e.g., Apriori algorithm) to determine predetermined data categories according to step 503. Step 504 describes examples of predetermined data categories in accordance with embodiments of the invention. In association rule learning (also known as association rule mining), a rule-based machine learning method is utilized to discover interesting relations between variables in large databases. Association rule learning utilizes computing tools to identify strong rules discovered in databases using some measures of interestingness. Various association rule algorithms could be utilized in the implementations of step 503, and embodiments of the invention are not intended to be limited by any examples herein.

In implementations, determining that a predetermined data category matches input data may be determined based on usage-related information obtained at step 501. In aspects of the invention, the predetermined data categories are associated with different ways to define data of interest to a user, such as defining data by: a time period, threshold values, or a data category, data feature or data parameter. Some examples of data categories include: Sensitive On Latest Data; Sensitive On Oldest Data; Sensitive On Specified Time Periods; Categorically Sensitive Data; Max or Min Sensitive Data; Feature Sensitive Data; and others. In embodiments, the schema module 412 of the schema server 404 implements step 503 based on predetermined rules stored in the rule module 413.

At step 504, the schema server 404 accesses a list of available methods for automatically generating data schemas (e.g., schema generating algorithms), each method being associated with at least one of a plurality of data categories. In aspects of the invention, each of the methods for automatically generating data schemas are associated with parameter or field limitations and/or instructions, which define a manner in which information is to be obtained and/or provided to the user. In embodiments, the schema server 404 utilizes machine learning techniques to maintain and update the list of available methods for automatically generating data schemas. In implementations, the list of available methods for automatically generated data schemas associates each data category with a best method or methods of determining a data schema for that data category, as determined through multiple iterations of the process of FIG. 5 (e.g., using machine learning). In embodiments, the schema module 412 of the schema server 404 accesses the list of available methods for automatically generating data schemas in the methods module 414 of the schema server 404. In other embodiments, the schema module 412 accesses a list of available methods for automatically generating data schemas stored on a remote database (not shown).

Various methods of automatically generating data schemas are known to one of ordinary skill in the art, and need not be described herein. However, some examples of methods for generating data schemas that may be utilized with embodiments of the invention include: The Latest n Records; The First n Records; The Location Specified n Records; Block Methods; Every n Rows; Feature Engineering; Go Through All Rows Only For Part Of The Columns; Check Distribution Of The Field; Random Selection; Percentage Of Data; and other data types.

It should be understood that The Latest n Records may comprise a method of obtaining the latest predetermined number n of one or more types of data records as defined by a predetermined time period (e.g., 2 days); The First n Records may comprise a method of obtaining the first predetermined number n of one or more types of data record; Block Methods may comprise obtaining predetermined blocks of one or more types of data record; and Every n Rows may comprise obtaining data in every predetermined number n rows of a table. Additionally, Feature Engineering may comprises extracting features (e.g., characteristics, properties, or attributes) from input data based domain knowledge; Go Through All Rows Only For Part Of The Columns may comprise obtaining data records from all rows for only a predetermined portion of one or more table columns; Check Distribution Of The Field may comprise determining an array of probability distributions, one for each location in a field, wherein the probability distribution at each location defines a probability of each feature value at the location. Further, Random Selection may comprise a method of randomly selecting data records; and Percentage Of Data may comprise determining a percentage of certain types of data records. It should be understood that various methods for automatically generating schema may be utilized by embodiments of the invention, and the examples given herein are not intended to be limiting.

At step 505, the schema server 404 determines a set of methods of automatically generating data schemas, wherein each method in the set of methods is associated with the data category determined at step 503, based on the list accessed at step 504. In embodiments, the set of methods comprises more than one method of automatically generating data schemas (from the list of available methods for automatically generating data schemas) associated with the determined data category, but less than the total number of methods in the list. In one example, the data category Sensitive on Latest Data is associated with the following methods for automatically generating data schemas: The Latest Records In n Latest Records; Every m Record in n Latest Records; and Three Blocks In n Latest Records. In another example, the data category Max & Min Sensitive is associated with the following methods for automatically generating data schemas: Estimate The Max & Min Value From The Distribution; Go Through All Records for Max & Min Columns Only; and Random Select Records. It should be understood that each data category may be associated with a different set of methods of automatically generating data schemas, wherein the methods for each data category may or may not overlap. In embodiments, the schema module 412 of the schema server 404 implements step 505.

At step 506, the schema server 404 determines a numeric indicator of schema accuracy for each method in the set of methods determined at step 505, utilizing a regression model based on historic data sets. Historic data sets may comprise training data generated by the schema server 404 over time as the schema server 404 performs the steps of FIG. 5 for various users over time. In implementations, the historic data is training data generated by the schema server 404 based on historic user input data for which a master schema has been generated and which has been through a verification process (e.g., see step 512) to assure a level of accuracy of the master schema (i.e., the master schema accurately represents data of interest to a user). In implementations, each set of historic data or historic training data is associated with a data category and related method(s) of automatically generating schema data, and represent the successful generation of an accurate master schema using the related method(s) of automatically generating schema data.

In embodiments, the schema server 404 trains a regression model with schema accuracy as the target, and other columns of data as features. Various regression models may be utilized to generate a numeric indicator in accordance with step 506. By way of non-limiting example, the following regression models may be utilized: Simple Linear Regression model; Lasso Regression; Logistic regression; Support Vector Machines; Multivariate Regression algorithm; Multiple Regression Algorithm. In embodiments, the schema module 412 of the schema server 404 implements step 506. Examples of determined numeric indicators of schema accuracy are shown in the table below.

TABLE

Exemplary Schema Accuracy Indicators for Various Methods of Automatic Schema Generation

| ID | Method Name | Schema Creation Time | Record Number | Record Usage Percentage | Other Features | Schema Accuracy |
|---|---|---|---|---|---|---|
| 1 | Latest m Of Latest n | 11 | 100 | 0.023 | . . . | 0.982 |
| 2 | Every m In Latest n | 20 | 150 | 0.050 | . . . | 0.971 |
| 3 | Blocks In Latest n | 10 | 130 | 0.045 | . . . | 0.955 |
| 4 | Random In Latest n | 15 | 110 | 0.031 | . . . | 0.973 |
| 5 | Blocks In Latest n | 120 | 501 | 0.009 | . . . | 0.985 |
| 6 | Every m In Latest n | 75 | 620 | 0.012 | . . . | 0.996 |
| 7 | Latest m of Latest n | 93 | 800 | 0.008 | . . . | 0.881 |
| 8 | Random in Latest n | 60 | 590 | 0.115 | . . . | 0.932 |
| 9 | . . . | . . . | . . . | . . . | . . . | . . . |

At step 507, the schema server 404 selects a subset (i.e., the best methods) of the set of methods determined at step 505 based on the numeric indicators of schema accuracy determined at step 506 and predetermined rules. By way of example, a predetermined rule may require the schema server 404 to select the top three (3) methods based on the three (3) highest schema accuracy indicators. In this first example, the schema server 404 would select the following methods from the above Table: Every m In Latest n (having an accuracy indicator of 0.996); Blocks In Latest n (having an accuracy indicator of 0.985); and Latest m Of Latest n (having an accuracy indicator of 0.982).

In another example, a predetermined rule may require the schema server 404 to select all methods having a schema accuracy indicator greater than 0.970. In this second example, the schema server 404 would select the following methods from the above Table: Every m In Latest n (having an indicator of 0.996); Blocks In Latest n (having an indicator of 0.985); Latest m Of Latest n (having an indicator of 0.982); Random In Latest n (having an indicator of 0.973); and Every m In Latest n (having an indicator of 0.971). In embodiments, the schema module 412 of the schema server 404 implements step 507.

With continued reference to FIG. 5A, at step 508, the schema server 404 generates a candidate schema for each method in the subset of methods selected at step 507, by implementing each method of the subset. In one example, the schema server 404 implements the following three most accurate methods: Every m In Latest n (having an indicator of 0.996); Blocks In Latest n (having an indicator of 0.985); and Latest m Of Latest n (having an indicator of 00.982), thereby generating three distinct candidate schemas (one for each method). In embodiments, the schema module 412 of the schema server 404 implements step 508.

At step 509, if the input data is associated with more than one data category, the schema server 404 may repeat the process of steps 503-508 for each data category associated with the revised input data. In one example, the schema server 404 determines that the input data is associated with the data categories: Sensitive On Latest Data; and Max & Min Sensitive Data. In this example, the schemer server 404 performs steps 503-508 for each data category.

With reference to FIG. 5B, at step 510, the schema server 404 merges the candidate schemas generated at step 508 into a single master schema using predetermined rules. By way of example, each candidate schema may generate a different Maximum value for a parameter, and a predetermined rule may state that only the highest Maximum value will be used in the master schema. In this example, the schema server 404 will keep only the highest Maximum value in the candidate schemas and remove the remaining Maximum values. In another example, default rules may cause the schema server 404 to utilize data from candidate schemas based on the methods used for generating the candidate schemas, wherein data generated from some methods will take precedence over data generated from other methods. In implementations, the master schema is created from the candidate schemas of a single data category. In other implementations, the master schema is created from the candidate schemas of multiple data categories. In embodiments, the master data schema defines the organization of input data in data tables and defines relationships between the data tables for use in data analysis. In aspects of the invention, the master schema is in the form of a computer-readable language. An exemplary master schema is shown in FIG. 7. In implementations, the master data schema comprises fields for parameters of interest to the user, numeric ranges for the fields, and formats for the fields. In embodiments, the schema module 412 of the schema server 404 implements step 510 based on predetermined rules in the rule module 413.

At step 511, the schema server 404 validates the master schema by testing the master schema of step 510 for errors using at least a portion of the input data and predetermined rules. In embodiments, the schema server 404 randomly selects a portion of the input data to utilize in validating the master schema. In embodiments, predetermined rules comprise test instructions to implement tests for one or more aspects of the data schema. In one example, test instructions cause the schema server 404 to determine minimum and maximum values of a parameter of the randomly selected data records of the input data, and compare the determined maximum and minimum values against maximum and minimum values in the master schema. In this example, if the determined maximum value of the parameter is greater than the maximum value for the parameter in the master data schema, or the determined minimum value of the parameter is less than the minimum value of the parameter in the master data schema, the schema server 404 determines that an error is present, since the maximum and minimum values in the master schema should represent the maximum and minimum values of the parameter. In embodiments, the schema module 412 of the schema server 404 implements step 511.

At step 512, the schema server 404 updates the master schema, as needed, based on any identified errors to produce a final master schema. For example, if the schema server 404 determines that a maximum value for a parameter in the master schema is less than a maximum value for the parameter in the input data, the schema server 404 can update the maximum value for the parameter in the master schema to match the maximum value for the parameter in the input data, thereby producing an updated or final master schema. In embodiments the schema module 412 of the schema server 404 implements step 512.

At step 513, the schema server 404 dynamically updates the list of available methods for generating data schemas based on validation data from step 511 (e.g., identified errors) and/or the numeric indicators of schema accuracy from step 506, over time, using predetermined rules. For example, if a particular method A of generating schema that is associated with a particular data category B generates candidate schema having a low numeric indicator of accuracy (e.g., below 0.950) over 50% of the time, the schema server 404 may determine based on predetermined rules to remove the association between the method A and the data category B in the list of available methods for generating data schemas. In this example, future runs of the automatic schema generating process of FIGS. 5A and 5B would not include method A in a set of methods associated with the data category B. In embodiments, the schema module 412 of the schema server 404 implements step 513 to update the list of available methods for generating data schemas in the methods module 414.

At step 514, the schema server 404 outputs the final master schema to the user or other designated entity (e.g., an analytics server not shown). In embodiments, the user may obtain the final master schema via a user interface provided by the schema server 404. In embodiments, the communication module 410 of the schema server 404 implements step 514.

Optionally, at step 515, the schema server 404 generates a database or a data frame for the input data based on the final master schema. For example, the schema server 404 may generate a database of the input data structure to enable a user to obtain data of interest to the user using data analytics tools and the database.

Figure 6:
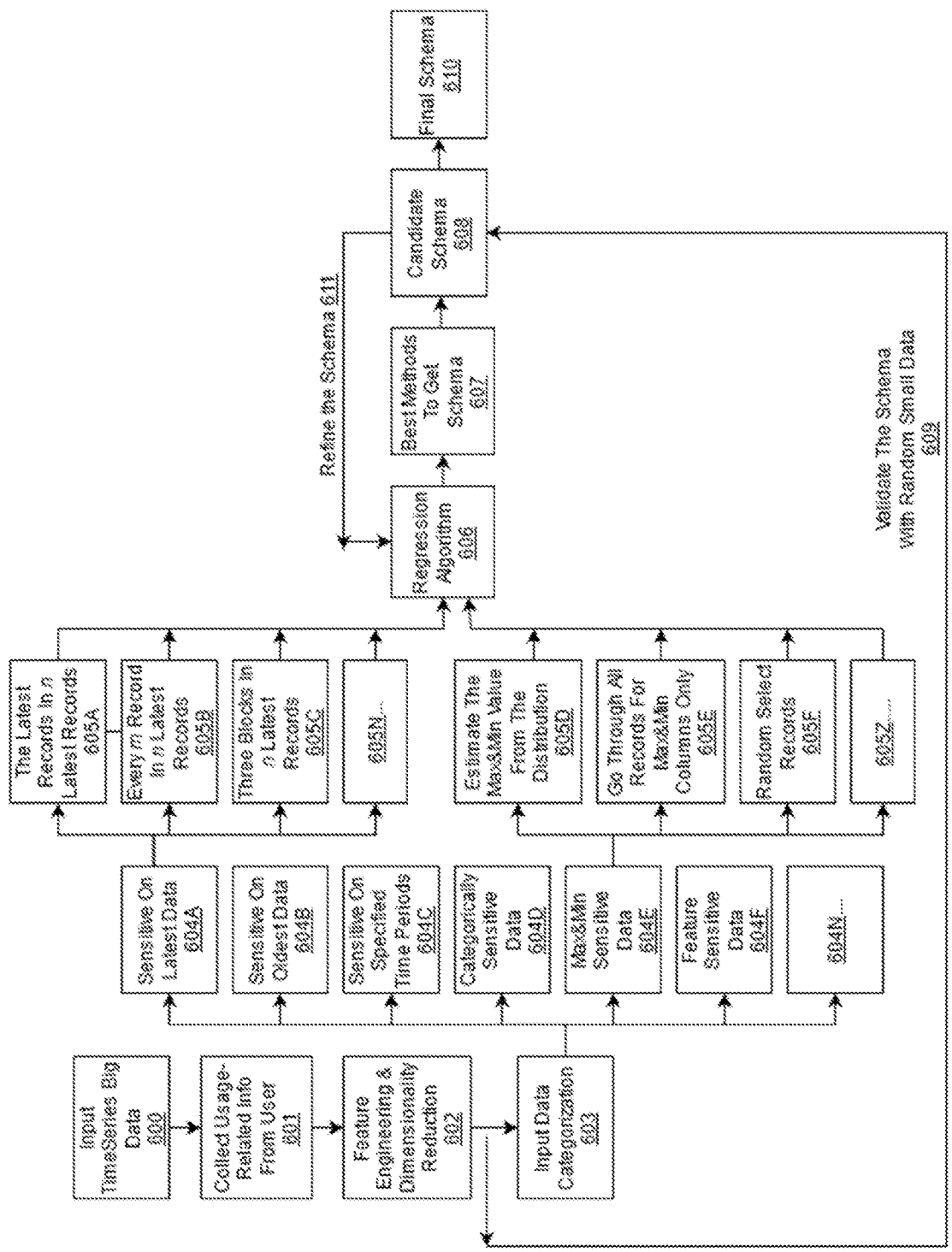
FIG. 6 is a block diagram illustrating an exemplary use scenario in accordance with aspects of the invention.

FIG. 6 depicts an exemplary use scenario in accordance with aspects of the invention. Steps of the method depicted in FIG. 6 may be carried out in the environment of FIG. 4 using the process of FIGS. 5A and 5B.

At 600, a user inputs time series data to the schema server 404 via a web portal (not separately shown), wherein the data has a size constituting big data. By way of example, the time series data may be between multiple terabytes of data and multiple zettabytes of data.

At 601, the schema server 404 collects usage-related information from the user regarding the time series data. The usage-related information may be collected by the schema server 404 in accordance with step 501 of FIG. 5A, for example.

Based on the usage-related information, at 602 the schema server 404 processes the time series data using feature engineering and dimensionality reduction techniques to produce revised time series data. Dimensionality reduction may refer to techniques that reduce the number of input variables in a dataset. In general, dimensionality reduction transforms data from a high-dimensional space into a low-dimensional space so that the low-dimensional representation retains some meaningful properties of the original data.

At 603, the schema server 404 determines that a plurality of predetermined data categories 604A-604N are a match for the time series data. In the example of FIG. 6, the input data received at 600 is a match for the following predetermined data categories: Sensitive On Latest Data 604A; Sensitive On Oldest Data 604B; Sensitive on Specified Time Periods 604C; Categorically Sensitive Data 604D; Max&Min Sensitive Data 604E; Feature Sensitive Data 604F, and other categories represented by 604N.

In accordance with step 506 of FIG. 5A, the schema server 404 then determines a set of methods associated with each of the data categories associated with the input time series data. By way of example, FIG. 6 depicts a first set of predetermined methods including methods 605A, 605B, 605C and additional methods represented by 605N, which are associated with the data category Sensitive On Latest Data 604A. Additionally, FIG. 6 depicts a second set of predetermined methods including methods 605D, 605E, 605F and additional methods represented by 605Z, which are associated with the data category Max&Min Sensitive Data 604E. It should be understood that the first and second sets of predetermined methods can be completely different, or can have one or more predetermined methods in common.

At 606, for each of the predetermined methods associated with a data category (e.g., 604A-604N), the schema server 404 generates a numeric indicator of schema accuracy utilizing a regression model or algorithm.

At 607 the schema server 404 determines the best (i.e., most accurate) methods based on the output of the regression model or algorithm (i.e., a numeric indicator of schema accuracy).

At 608 the schema server 404 generates a candidate schema for the best methods. In the example of FIG. 6, the candidate schemas are merged into a master schema and validated at 609. In implementations, the schema server 404 validates the master schema using randomly selected data records from the input data (e.g., revised input data) to determine errors in the master schema. The schema server 404 may then revise the master schema to obtain the final schema at 610 based on the validation data (e.g., error data). The schema server 404 may also utilize the validation data to update associations between data categories and predetermined methods for automatically generating data schemas as represented at 611, such that future numeric indicators of schema accuracy become more accurate over time, resulting in less errors detected during validation of the master schemas.

FIG. 7 depicts a portion of an exemplary master data schema generated in accordance with embodiments of the invention.

Based on the above, it can be understood that embodiments of the invention: define and create multiple methods to get data schemas for different types of data; recognize the type of the input big data using an association rule algorithm; in a specified data group, utilize a regression algorithm to select the best method(s) to get data schemas; and using the best method(s), generate a master data schema for the input big data.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
selecting, by a computing device, a subset of methods to generate data schemas for input data, from a list of methods for generating data schemas, based on an output of a regression model, wherein the output of the regression model comprises a numeric indicator of schema accuracy for each method in the set of methods associated with the determined data category;
generating, by the computing device, a candidate schema for each method in the subset of methods to generate data schemas; and
generating, by the computing device, a master data schema for the input data by merging the candidate schema for each method in the subset of methods to generate data schemas, utilizing predetermined rules, wherein the predetermined rules comprise selecting three methods having a highest numeric indicator or schema accuracy.

2. The method of claim 1, wherein the selecting the subset of methods is based on the numeric indicator of schema accuracy.

3. The method of claim 1, wherein the input data comprises big data having a size between multiple terabytes of data and multiple zettabytes of data.

4. The method of claim 1, further comprising:
obtaining, by the computing device, original input data from a user, wherein the original input data is in the form of time series data;
obtaining, by the computing device, usage-related information for the original input data from the user via a graphical user interface, wherein the usage-related information is associated with a purpose for which the original input data will be utilized; and
processing, by the computing device, the original input data based on the usage-related information to generate revised input data, wherein the input data comprises the revised input data.

5. The method of claim 1, wherein:
the master data schema defines the organization of input data in data tables and defines relationships between the data tables for use in data analysis; and
the master data schema comprises fields for parameters of interest to the user, numeric ranges for the fields, and formats for the fields.

6. The method of claim 1, further comprising: generating a database or data frame of the input data based on the master data schema; and
dynamically updating the list of methods for generating data schemas based on a validation data and the numeric indicators.

7. The method of claim 1, further comprising:
determining, by the computing device, a predetermined data category associated with input data based on association rules;
accessing, by the computing device, the list of methods for generating data schemas, wherein each of the methods of generating data schemas is associated with one or more predetermined data categories;
determining, by the computing device from the list of methods for generating data schemas, a set of methods associated with the determined data category; and
generating, by the computing device, the numeric indicator of schema accuracy for each method in the set of methods associated with the determined data category, using the regression model based on historic data.

8. The method of claim 7, further comprising:
identifying, by the computing device, errors in the master schema using at least a portion of the input data and predetermined rules; and
updating, by the computing device, the master schema based on the identified errors.

9. The method of claim 8, further comprising: dynamically updating, by the computing device, the list of methods for generating data schemas by revising an association between one of the methods for generating data schemas and one of the one or more data categories, wherein the revisions are based on the numeric indicators or the identified errors.

10. The method of claim 1, wherein the computing device includes software provided as a service in a cloud environment.

11. A computer program product comprising one or more computer readable storage media having program instructions collectively stored on the one or more computer readable storage media, the program instructions executable to:
determine a predetermined data category associated with input data of a user based on association rules;
determine, from a list of methods for generating data schemas, a set of methods associated with the determined data category;
generate a numeric indicator of schema accuracy for each method in the set of methods associated with the determined data category, using a regression model based on historic data;
select a subset of the set of methods associated with the determined data category based on the numeric indicators;
generate a candidate schema for each method in the subset of the set of methods associated with the determined data category; and
generate a master data schema for the input data by merging the candidate schema for each method in the subset of the set of methods associated with the determined data category, utilizing predetermined rules, wherein the predetermined rules comprise selecting three methods having a highest numeric indicator or schema accuracy.

12. The computer program product of claim 11, wherein the selecting the subset is based on methods having numeric indicators of schema accuracy with the highest values.

13. The computer program product of claim 11, wherein the input data comprises big data having a size between multiple terabytes of data and multiple zettabytes of data.

14. The computer program product of claim 11, wherein the program instructions are further executable to:
obtain original input data from the user, wherein the original input data is in the form of time series data;
obtain usage-related information for the original input data from the user, wherein the usage-related information is associated with a purpose for which the original input data will be utilized; and
process the original input data based on the usage-related information to generate revised input data, wherein the input data comprises the revised input data.

15. The computer program product of claim 11, wherein:
the master data schema is written in a computer-readable language, defines the organization of input data in data tables, and defines relationships between the data tables for use in data analysis; and
the master data schema comprises fields for parameters of interest to the user, numeric ranges for the fields, and formats for the fields.

16. The computer program product of claim 11, wherein the program instructions are further executable to: generating a database or data frame of the input data based on the master data schema.

17. The computer program product of claim 11, wherein the program instructions are further executable to:
identify errors in the master schema using at least a portion of the input data and predetermined rules;
update the master schema based on the identified errors; and
dynamically update the list of methods for generating data schemas by revising an association between one of the methods for generating data schemas and one of the one or more data categories based on one of the group consisting of: the numeric indicators; and the identified errors.

18. A system comprising:

a processor, a computer readable memory, one or more computer readable storage media, and program instructions collectively stored on the one or more computer readable storage media, the program instructions executable to:

determine a predetermined data category associated with input data of a user based on association rules;

determine, from a list of methods for generating data schemas, a set of methods associated with the determined data category;

generate a numeric indicator of schema accuracy for each method in the set of methods associated with the determined data category, using a regression model based on historic data;

select a subset of the set of methods associated with the determined data category based on the numeric indicators;

generate a candidate schema for each method in the subset of the set of methods associated with the determined data category; and generate a master data schema for the input data by merging the candidate schema for each method in the subset of the set of methods associated with the determined data category, utilizing predetermined rules, wherein the predetermined rules comprise selecting three methods having a highest numeric indicator or schema accuracy.

19. The system of claim 18, wherein the program instructions are executable to:

determine a second data category associated with the input data of the user based on association rules;

determine, from the list of methods for generating data schemas, a second set of methods associated with the determined second data category;

generate a numeric indicator of schema accuracy for each method in the second set of methods associated with the determined second data category, using the regression model based on historic data;

select a second subset of the second set of methods associated with the determined second data category based on the numeric indicators; and generate a candidate schema for each method in the second subset of the set of methods associated with the determined second data category;

wherein the generating the master data schema for the input data further comprises merging the candidate schema for each method in the subset of the set of methods associated with the determined data category with the candidate schema for each method in the second subset of the second set of methods associated with the determined second data category utilizing the predetermined rules.

20. The system of claim 18, wherein the program instructions are further executable to:

obtain original input data from the user, wherein the original input data is in the form of time series data;

obtain usage-related information for the original input data from a remote computing device of the user, wherein the usage-related information is associated with a purpose for which the original input data will be utilized; and process the original input data based on the usage-related information to generate revised input data, wherein the input data comprises the revised input data.

* * * * *